United States Patent

[11] 3,630,324

| [72] | Inventors | Elvin L. Stretten;<br>Ivan J. Stretten, both of Union Lake, Mich. |
|---|---|---|
| [21] | Appl. No. | 884,558 |
| [22] | Filed | Dec. 12, 1969 |
| [45] | Patented | Dec. 28, 1971 |
| [73] | Assignee | Dallas Industries, Inc.<br>Troy, Mich. |

[54] MOVEMENT CUSHIONING DEVICE
2 Claims, 3 Drawing Figs.

[52] U.S. Cl..................................... 188/312,
188/319, 188/322
[51] Int. Cl..................................... F16f 9/02
[50] Field of Search............................ 188/282,
301, 312, 319, 322; 16/66, 84

[56] References Cited
UNITED STATES PATENTS
3,215,229  11/1965  Bunnell......................... 188/312
489,757  1/1893  Reilly............................ 188/312
3,147,827  9/1964  Weisheit........................ 188/319

*Primary Examiner*—George E. A. Halvosa
*Attorney*—William T. Sevald

ABSTRACT: A movement cushioning device using compressed air having a piston dividing a cylinder into two sealed chambers and two piston rods on the piston extending in opposite directions from the piston and outwardly of the cylinder; the piston having a metering orifice providing the only air communication between the chambers, and means for introducing compressed air to one or both of the chambers. Imposed force on a piston rod moving the piston against the compressed air in one chamber with piston travel being restrictively allowed by the rate of throttled airflow of the metering orifice. A throttle pin is threaded in one piston rod for selectively occluding the metering orifice to provide various airflow rates from one chamber to another.

PATENTED DEC 28 1971 3,630,324

INVENTORS
ELVIN L. STRETTEN
BY IVAN J. STRETTEN

ATTORNEY

MOVEMENT CUSHIONING DEVICE

This invention relates to a compressed air movement cushioning device for reducing shocks of heavy loads under sudden acceleration and deceleration conditions.

Various cushioning devices have been employed heretofore, however, the several devices of the prior art have not proven entirely satisfactory inasmuch as they are complicated in design and construction, expensive to manufacture, and often unreliable in use.

With the foregoing in view the primary object of the invention is to provide a compressed air cushioning device which is simple in design and construction, inexpensive to manufacture, and highly reliable in use.

An object of the invention is to provide a compressed air cushioning device which can be manufactured inexpensively as the component parts are easily made and the assembly of the parts is readily accomplished.

An object of the invention is to provide means to connect a source of supply of compressed air to each of the cylinder chambers on either side of the piston independently of the other so as to provide equalized air compression and to provide equalized air pumping capabilities in both chambers.

An object of the invention is to provide a metering orifice through the piston between opposed chambers in the cylinder to eliminate conduits, passages, and channels in the housing which are difficult to form and to maintain properly sealed under heavy repeated use.

An object of the invention is to connect a source of compressed air supply to one chamber with the metering orifice supplying compressed air to the other chamber to equalize pressure in the chambers when the device is at rest.

An object of the invention is to provide a throttle pin adjustably threaded in a piston rod on the piston for selectively occluding the metering orifice in the piston to provide various differently throttled rates of metering.

These and other objects of the invention will become apparent by reference to the following description of the movement cushioning devices embodying the invention taken in connection with the accompanying drawing in which.

Figure 1:
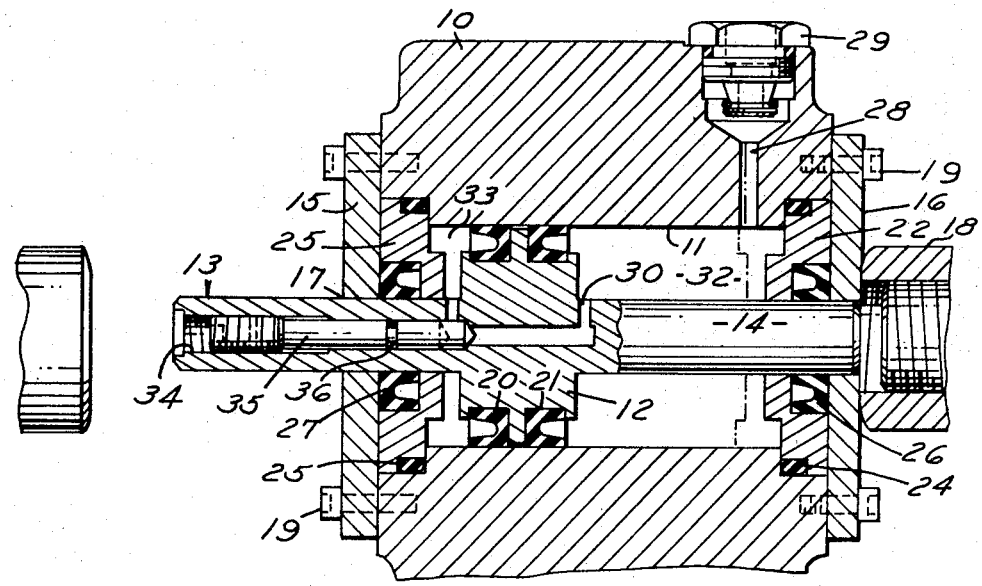
FIG. 1 is a axial cross-sectional view of a cushioning device such as taken on the line 1—1 of FIG. 2.

Referring now to the drawing wherein like numerals refer to like and corresponding parts throughout the several views, the cushioning devices disclosed therein to illustrate the invention comprise a housing 10 having an open ended internal annular wall defining an air cylinder 11 having opposite open ends. A piston 12 is slidably positioned in the cylinder 11. Paired piston rods 13 and 14 are connected to the piston 12 and extend oppositely therefrom endwise outwardly of the cylinder 11. Closure means such as end plates 15 and 16 are mounted on the housing 10 over the ends of the cylinder 11 and are equipped with apertures 17 and 18 slidably receiving the piston rods 13 and 14 respectively. Socket head screws 19 lead through the end plates 15 and 16 and secure them to the housing 10. Seals 20 and 21 seal the piston 12 relative to the cylinder 11 in both directions of reciprocation. Hubs 22 and 23 lie between the end plates 15 and 16 respectively and the housing 10. Seals 24 and 25 lie between the hubs 22 and 23 respectively and the housing 10 to seal the cylinder at the open ends of the housing 10. Seals 26 and 27 lie between the hubs 22 and 23 and piston rods 13 and 14 and seal the piston rods at the end of the cylinder 11. A radial channel 28 leads through the housing 10 to the interior of the cylinder 11. A one-way valve 29 controls the channel 28 so as to allow air under pressure to be introduced to the cylinder 11 and to prevent escape of air from the cylinder 11. The piston 12 divides the cylinder 11 into a chamber 32 and a chamber 33 on either side of the piston 12. A metering orifice 30 through the piston 12 allows metered flow of compressed air between the chambers 32 and 33 as the piston 12 reciprocates. One piston rod has an axial aperture 34 leading to the metering orifice 30. A pin 35 is adjustably threaded in the axial aperture 34 and is adapted to adjustably partially block the metering orifice 30. A seal 36 between the pin 35 and the aperture 34 prevents the escape of air past the pin 35.

Figure 3:
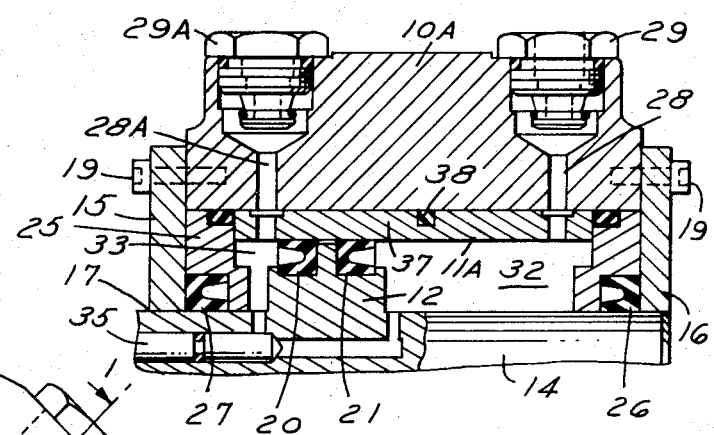
FIG. 3 is a partial axial cross section of a cushioning device similar to FIG. 1 showing dual air supply means and a wear sleeve in the cylinder.
Figure 2:
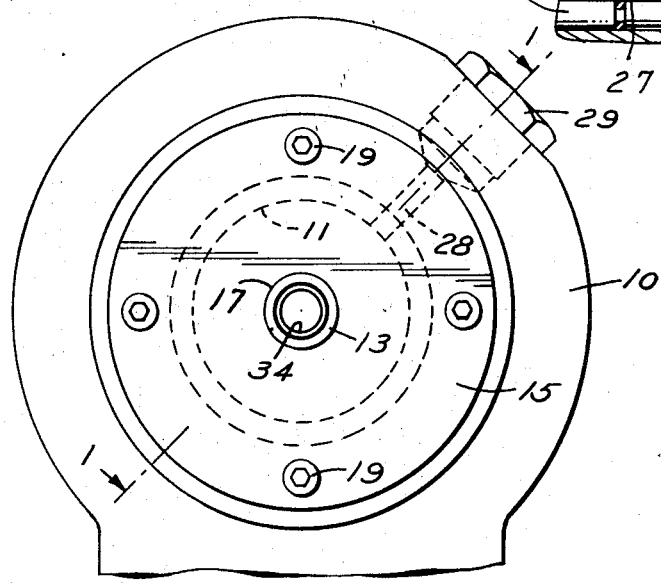
FIG. 2 is an end elevational view of the device seen in FIG. 1.

The modification shown in FIG. 3 has a second air supply channel 28A and a second one way valve 29A controlling the air supply channel 28A so that air may be introduced and so that air cannot escape therefrom. A sleeve bushing 37 defines the cylinder 11A in FIG. 3 and is equipped with a circumferential seal 38 to prevent travel of air between the bushing 37 and the housing 10A around the piston 12.

In the device shown in FIG. 3, it will be understood that with the connection of air supply to the valves 29 and 29A, that their one-way characteristics prevent air travel between the chambers 32 and 33 via the channels 28 and 28A through or in conjunction with the air supply lines as the one way valves 29 and 29A prevent outward flow of air from either chamber 32 and 33.

In the device of FIG. 3, it will be understood that compressed air supply under pressure is introduced directly and equally to both chambers 32 and 33 independently of each other.

In the device of FIG. 1, it will be understood that the air pressure introduced by the valve 29 and channel 28 to chamber 32 feeds through the metering orifice 30 to chamber 33 to provide equalized pressure in the chambers.

In use, with the device mounted on a traveling carriage for example, drive is applied to the projecting piston rod 13 or 14 to cushion application of drive through the device to the load until drive is removed such as adjacent the point at which the carriage is to stop. This moves the projecting piston rod inwardly and projects the other piston rod. The now opposite projecting piston rod 13 or 14 then engages a stop (upon the release of drive) and cushions the carriage to a standstill in a short space without impact or vibration. In another exemplary application, the device can be mounted on the table and the carriage adapted to engage the extending piston rod 13 or 14 adjacent its end of travel to resiliently decelerate the carriage to a stop without impact and vibration. Since the drive of a reciprocating carriage is bidirectional, it will be understood that he piston 12 and piston rods 13 and 14 are reset at every reciprocating stroke of the device on the carriage so that it is established at its proper position for the next action by the occurrence of the last action.

The metering orifice 30 is accurately sized to provide the engineered maximum rate of throttled compressed air flow through the piston 12. The throttle pin 35 is advanceable into the metering orifice 30 to reduce its cross-sectional area and to thereby decrease its throttling rate from its maximum to an operational minimum. Thus the device may be adjusted on the job for various loads and speeds to facilitate the handling of different loads at various speeds with full facility.

We claim:

1. A movement device for cushioning the shocks of starting and stopping loads with compressed fluid air over a relatively short space under sudden acceleration and deceleration conditions to resiliently reduce impact and to substantially eliminate bounce-back to facilitate fast accurate positioning of loads repeatedly comprising, a housing having an open ended annular internal wall defining an air cylinder having opposite ends, a piston in said cylinder, first and second oppositely disposed piston rods on said piston extending outwardly of said cylinder opposite ends, closure means on said housing closing said cylinder opposite ends; each said closure means having an aperture slidably receiving one said piston rod;

seal means sealing off air communication between said piston and cylinder, between said closure means and housing, and between said closure means and piston rods whereby said piston divides said cylinder into two opposed sealed chambers on either side of said piston;

said housing having a first channel leading to one said chamber and a second channel leading to the other said chamber for supplying compressed air to each said chamber independently of the other providing said chambers with equalized air pressure on either side of said piston;

a one-way valve controlling each said channel permitting supply airflow to said chambers and preventing return airflow therefrom;

a metering orifice in said piston leading between said cylinder chambers providing metering airflow between said chambers;

reciprocation of said piston in said cylinder by force imposed on one said piston rod being resisted by the metered rate of airflow through said metering orifice from one said sealed cylinder chamber to the other to resiliently buffer piston travel to cushion the force imposed, a throttle pin adjustably threaded in one said piston rod adapted to selectively occlude said metering orifice for selectively obstructing said metering orifice in said piston to provide variously throttled metering rates;

a sleeve bushing in said housing surrounding said piston and defining said air cylinder; and a circumferential seal between said sleeve bushing and said housing to prevent travel of air between said sleeve bushing and said housing around said piston.

2. A movement device for cushioning load shocks with compressed fluid air over a relatively short space under sudden acceleration and deceleration conditions to resiliently reduce impact to facilitate quick accurate positioning of loads repeatedly comprising, a housing having an open ended annular internal wall defining an air cylinder having opposite ends, a piston in said cylinder, first and second oppositely disposed piston rods on said piston extending outwardly of said cylinder opposite ends, closure means on said housing at said opposite ends of said cylinder; each said closure means at each end of said cylinder having an aperture slidably receiving one said piston rod;

seal means sealing off air communication between said piston and cylinder, between said end plates and housing, and between said closure means and piston rods whereby said piston divides said cylinder into two opposed sealed chambers on either side of said piston, said housing having a channel leading to one said chamber for supplying compressed air to said chamber; and a one-way valve controlling said channel permitting supply airflow to said chamber and preventing return airflow therefrom;

said piston having a metering orifice leading between said chambers providing metered airflow between said chambers when the device is working;

said metering orifice bleeding compressed air from said one chamber to said other chamber to equalize air pressure on either side of said piston when the device is at rest;

reciprocation of said piston in said cylinder by force imposed on one said piston rod being resisted by the metered rate of airflow through said metering orifice of the pressurized air from one said sealed cylinder chamber to the other to buffer piston travel to cushion the force imposed, a throttle pin adjustably threaded in one said piston rod adapted to selectively occlude said metering orifice for selectively obstructing said metering orifice in said piston to provide variously throttled metering rates, a sleeve bushing in said housing surrounding said piston and defining said air cylinder.

* * * * *